United States Patent [19]
Tyler et al.

[11] Patent Number: 5,527,213
[45] Date of Patent: Jun. 18, 1996

[54] HONING TOOL AND METHOD OF MAKING

[75] Inventors: James B. Tyler; R. Brown Warner, both of Westlake; Joseph P. Gaser, Euclid, all of Ohio

[73] Assignee: Jason, Inc., Cleveland, Ohio

[21] Appl. No.: 52,366

[22] Filed: Apr. 23, 1993

[51] Int. Cl.⁶ ..................................................... B24B 29/00
[52] U.S. Cl. .............................. 451/466; 451/469; 300/21
[58] Field of Search ..................................... 451/461, 465, 451/466, 486; 15/159 R, 177, 171, 190; 300/21

[56] References Cited

U.S. PATENT DOCUMENTS

| | | | |
|---|---|---|---|
| 878,344 | 2/1908 | Chazal | 15/159.1 |
| 1,390,973 | 9/1921 | Von Niessen | 15/159.1 |
| 1,601,217 | 9/1926 | Jones | 15/190 |
| 2,019,130 | 10/1935 | Garbe | 15/171 |
| 2,049,324 | 7/1936 | Schneider | 451/464 |
| 2,388,867 | 11/1945 | Peterson | 15/159.1 |
| 2,511,004 | 6/1950 | Peterson | 15/190 |
| 2,771,625 | 11/1956 | Peloquin | 15/190 |
| 3,016,554 | 1/1962 | Peterson | 15/159.1 |
| 3,312,993 | 4/1967 | Nelson | 15/190 |
| 5,126,847 | 6/1993 | Scheider et al. | 451/464 |

*Primary Examiner*—Maurina T. Rachuba
*Attorney, Agent, or Firm*—Renner, Otto, Boisselle & Sklar

[57] ABSTRACT

An elongated narrow and rather thin honing tool is made from a somewhat soft metal or plastic cup holder. A tightly packed bundle of abrasive containing plastic monofilaments is inserted to the bottom of the cup holder and the cup rim is swaged inwardly to girdle and grip the bundle holding the bundle in the cup holder. The projecting tightly packed tips of the monofilaments form the working face of the honing tool. The preferred plastic for the monofilaments is nylon and the preferred transverse sectional shape of such monofilaments is rectangular, although other plastics and shapes may be used. Several methods for forming the tool are disclosed which include an insertion step followed by a swaging step. The bottom of the cup may be slightly arcuate to impart a curved working face to the bundle. The bundle may be cut or trimmed before or after insertion.

13 Claims, 2 Drawing Sheets

HONING TOOL AND METHOD OF MAKING

DISCLOSURE

This invention relates generally as indicated to a honing tool, and more particularly to a low cost honing tool and method of making that tool

BACKGROUND OF THE INVENTION

This invention pertains to honing tools and more particularly to honing tools of the general type described in prior copending applications U.S. Ser. No. 07/508,060 filed Apr. 11, 1990 of Alfred F. Scheider et. al., entitled Abrasive Filament Honing Tool and Method of Making and Using; U.S. Ser. No. 07/970,865, filed Nov. 3, 1992 of Alfred F. Scheider et. al., entitled "Abrasive Filament Honing Tool and Method of Making and Using; and U.S. Ser. No. 07/941,544, filed Sep. 8, 1992 of Guy H. Carmichael et. al., entitled "Honing Process".

The honing tools described in the above prior applications may be used, for example, in secondary or tertiary operations in the high volume production of engines imparting an improved surface finish to cylinder walls. The working face of the tool comprises the compacted tips of an elongated bundle of generally parallel plastic monofilaments which contain abrasive homogeneously embedded throughout. The tools are made by utilizing a special adhesive in the bottom of an elongated cup holder which secures one end of the bundle inside the cup holder while the opposite end projects outwardly a relatively short distance. In order to make a tool having the desired operating characteristics with the adhesive process described considerable care is required. This is especially true if the tool is operated in OEM production machinery which is essentially continuously and repeatedly running. Such machinery usually has a rotating and reciprocating head for each bore and is highly automated. As a result, such tools are relatively expensive.

In contrast to the highly automated production facilities of an OEM engine builder, there are many honing applications where the characteristics of the tool would be beneficial, but where the use or production of the tool might not be cost effective. One such example would be an engine rebuilder where a single honing machine head might be mounted on something similar to a drill press. Where an OEM production facility may do 150 engines in an hour or so, an engine rebuilder may do 150 in one year.

Accordingly, there is a need for a lower cost tool of the type described. Since the use of the special adhesive and its application contributes to the cost of the tool, it would also be desirable to be able to make an acceptable tool having the desired characteristics without the use of an adhesive.

SUMMARY OF THE INVENTION

An elongated narrow and somewhat thin honing tool is made from a relatively soft metal or plastic cup holder. A tightly packed bundle of abrasive containing plastic monofilaments is inserted into the cup holder and the cup rim is swaged inwardly to girdle and grip the bundle holding the bundle in the cup holder. The projecting tightly packed tips of the monofilaments form the working face of the honing tool. The preferred plastic for the monofilaments is nylon and the preferred transverse sectional shape of such monofilaments is rectangular, although other plastics and shapes may be used.

Several methods for forming the tool are disclosed which include an insertion step followed by a swaging step. The bottom of the cup may be slightly arcuate to impart a curved working face to the bundle. The bundle may be cut or trimmed before or after insertion.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION OF THE PREFERRED EMBODIMENTS

Figure 1:
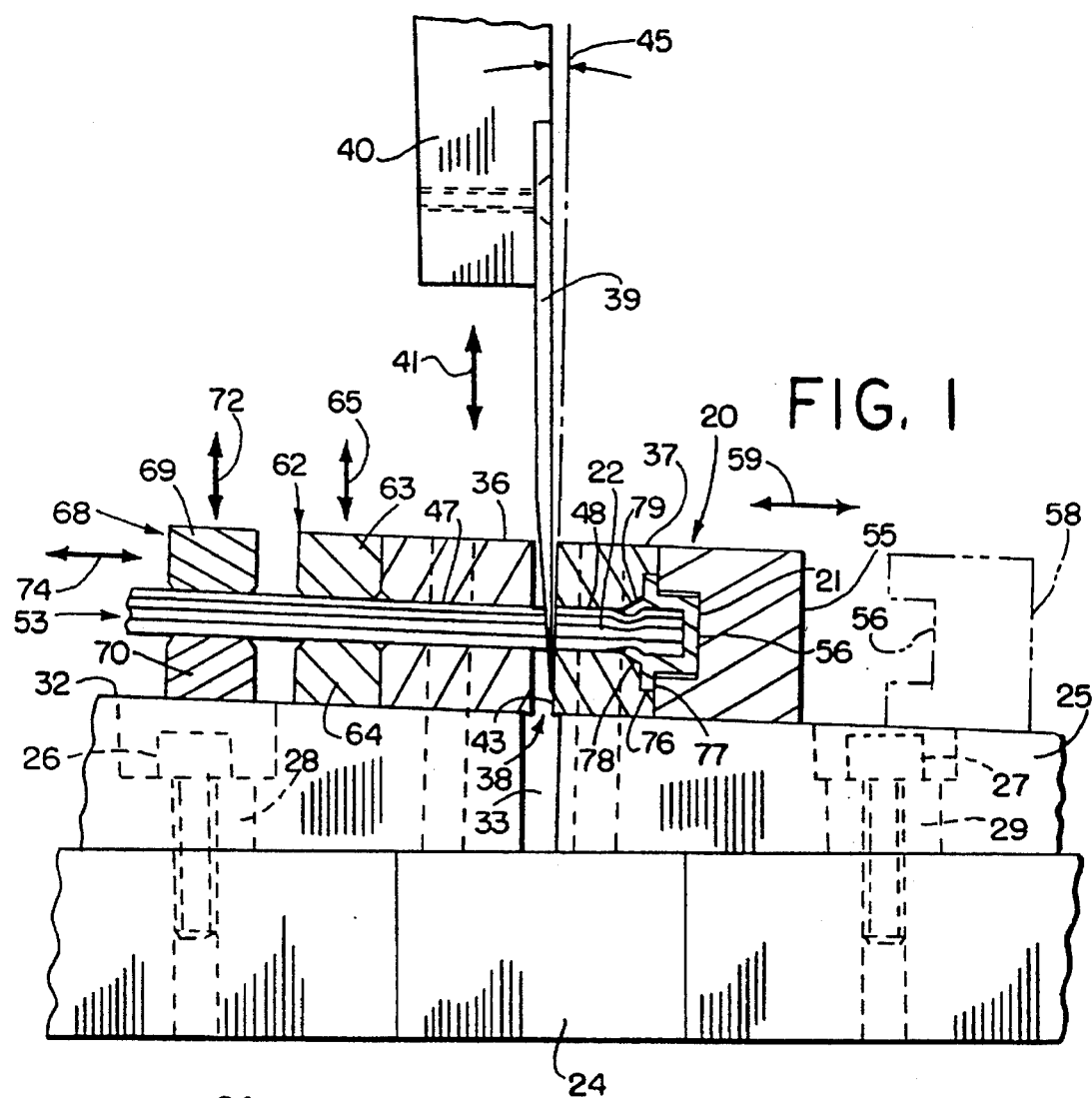
FIG. 1 is an illustration of apparatus and a process for making honing tools in accordance with the present invention.

Referring initially to FIG. 1, there is illustrated apparatus for manufacturing a honing tool in accordance with the present invention. The honing tool is shown generally at 20 and comprises an elongated cup holder 21 and a bundle of tightly packed abrasive containing monofilaments shown at 22.

The apparatus comprises a bolster plate 24 on which is mounted a bottom plate 25. The bottom plate 25 is secured to the bolster plate by fasteners seen at 26 and 27 which are fitted in slots 28 and 29, respectively which allows the plate to be adjusted right or left in the plane of FIG. 1.

The top surface of the plate 32 slopes at approximately 2° from left to right as seen in such figure. The plate 25 is also provided with a cutter blade clearance slot shown at 33.

Fixedly mounted on the bottom plate is a guide block 36 and a guide and clinch block 37. As illustrated, there is a slight space between such blocks as seen at 38 which accommodates the movement of cutter blade 39. The cutter blade is mounted on a hydraulically operated blade holder 40 with the hydraulic cylinder operating the holder moving the blade up and down as seen by the arrow 41. The sharp edge of the cutter blade bears against the interior face 43 of guide and clinch block 37. In this manner adjustment of bottom plate 25 horizontally adjusts cutter preload. Also, the interior surface of the guide and clinch block 37, is at an angle approximately 2° to vertical as indicated at 45 since it is perpendicular to the sloping top surface 32 of the plate 25.

The guide blocks 36 and 37 each have aligned passages seen at 47 and 48 which accommodate an elongated bundle of parallel abrasive containing monofilaments seen at 50. The bundle 50 may be a number of feet in length or even an indefinite length and, of course, is much longer than the bundle of monofilaments which will be employed in the honing tool. Each monofilament within the bundle, however, is parallel to each other monofilament and the openings 47 and 48 in the guide blocks insure that the bundle is properly shaped and compacted.

On the right hand side of FIG. 1, there is illustrated a holder block indicated at 55, which includes a channel 56 adapted to receive the tool cup holder 21. As illustrated by the phantom line position 58, the holder block is mounted for reciprocation by an hydraulic cylinder not shown so that the holder block may move in a reciprocating fashion as indicated by the arrow 59. At the left hand side of FIG. 1, there is illustrated a first bundle clamp 62 which includes top and bottom bundle gripping shoes 63 and 64, respectively. The top bundle gripping shoe may be moved vertically by a pneumatic piston-cylinder assembly as seen by the arrow 65.

A second bundle clamp is shown at 68 and includes top and bottom shoes 69 and 70 respectively with the top shoe 69 being vertical movable by a pneumatic piston-cylinder assembly as seen by the arrow 72. The entire pneumatic clamp is also movable along the top of the plate 25 by a pneumatic cylinder as indicated by the arrow 74. In this manner, the clamp 68 may be indexed horizontally along the plate 25.

It is noted that the guide and clinch block 37 includes a recess seat 76 for flange 77 which projects laterally from the cup holder. The block also includes a wedge surface 78 which surrounds the end of the passage 48 entering the recess 76. It is the wedge surface which completely surrounds the passage 48 which swages or deforms inwardly the rim 79 of the cup holder to girdle and grip the bundle of monofilaments which have been inserted therein.

With the blade 39 retracted and the holder block 55 retracted and in the phantom line position 58, and also with the left hand clamp 68 open and retracted or to the left in FIG. 1, and the clamp 62 open, the apparatus may be in a cycle start (or stop) position. With the essentially continuous bundle of monofilaments 53 in place, to the left of the blade as seen in FIG. 1, the cycle may then start with the following sequence.

A cup holder 21 is loaded into the holder block 55 either manually or automatically and the holder block is indexed forwardly or to the left to an intermediate locate position. The clamp 68 is closed and then moved to right as seen in FIG. 1 to a stop position. With the bundle clamped and indexed to the right, the previously severed end of the bundle projects slightly to the right of the guide block 37 through the opening 48. The hydraulic cylinder moving the holder block is again actuated to move the holder block and the cup holder therein further to the left as seen in FIG. 1, causing the previously severed end of the bundle to be inserted into the interior of the cup. Concurrently the wedge surfaces in the guide block engage the rim of the cup swaging the rim inwardly as shown completely girdling and gripping the bundle of monofilaments.

The cutter blade then moves through its cycle with the blade edge running against the rear of the guide block to sever the bundle of monofilaments now clamped in the cup holder. After the blade has retracted, the clamp 62 is closed while the clamp 68 is opened and then retracted to the left. The holder block 55 is retracted to the right and the formed honing tool is removed, again either automatically or manually. The parts of the apparatus have then returned to their cycle start (or stop) position.

Figure 2:
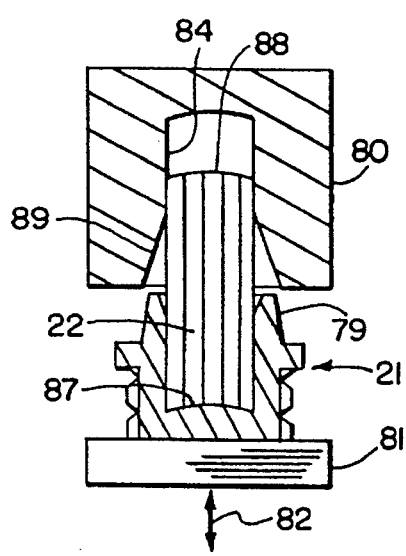
FIGS. 2 and 3 illustrate schematically two steps in an alternative process.
Figure 3:
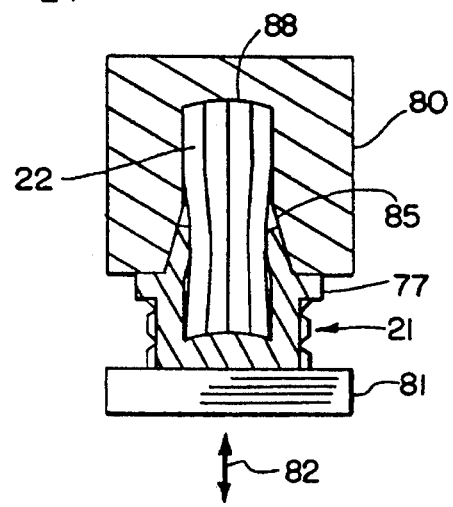

In the apparatus illustrated in FIG. 1, it will be appreciated that the filling, swaging and trimming step takes place all at the same station. It will, however, be appreciated that the swaging or clinching step may take place at a second or subsequent station such as shown in FIGS. 2 and 3. As illustrated in such Figures, the cup holder 21 has had inserted into it a tightly packed bundle of monofilaments, each extending parallel to each other and projecting beyond the rim 79. The loaded cup holder is then placed in the secondary apparatus which comprises a top swaging die 80, a vertically movable bottom platen 81 and a double acting hydraulic cylinder as illustrated schematically by the arrow 82. In FIG. 3, the platen has elevated to its furthest extent moving the bundle 22 into die cavity 84 with the mouth of the cavity being provided with the wedge surface seen at 85 which extends completely around the opening to the cavity. In this manner as the flange 77 abuts the bottom of the die 80, the rim 79 of the cup holder has then been swaged or clinched inwardly completely to girdle and grip the bundle, securing the bundle to the cup holder. When the parts are separated from the FIG. 3 position, the finished honing tool is removed.

It is noted in FIGS. 2 and 3, that the bottom 87 of the cup holder is illustrated as having a slightly arcuate or curved surface which imparts a curved surface to the working face seen at 88. The interior of the cavity 84 may be shaped accordingly to provide a stop for the working face monofilament tips insuring that the finished product has the desired curved face.

Figure 4:
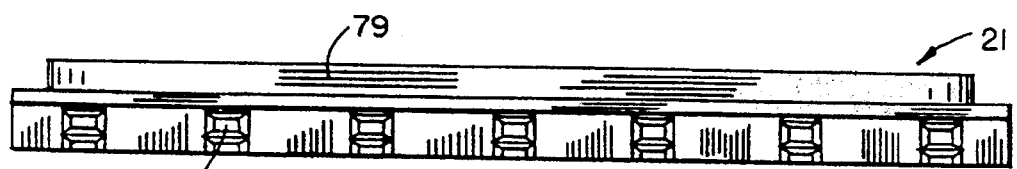
FIG. 4 is an enlarged elevation of a holder.
Figure 5:
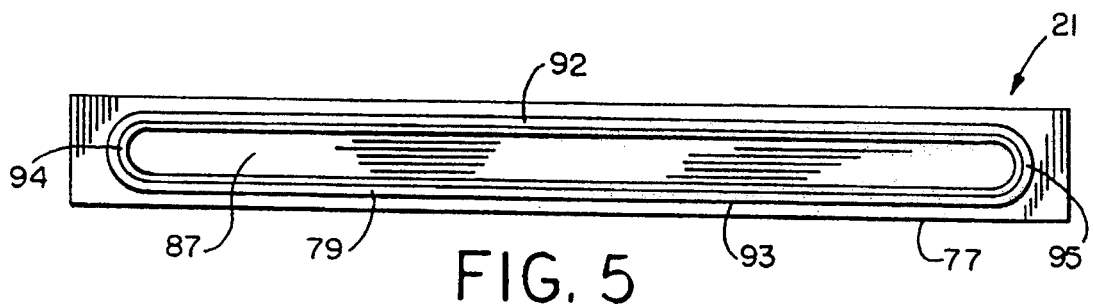
FIG. 5 is a top plan view of the holder.
Figure 6:
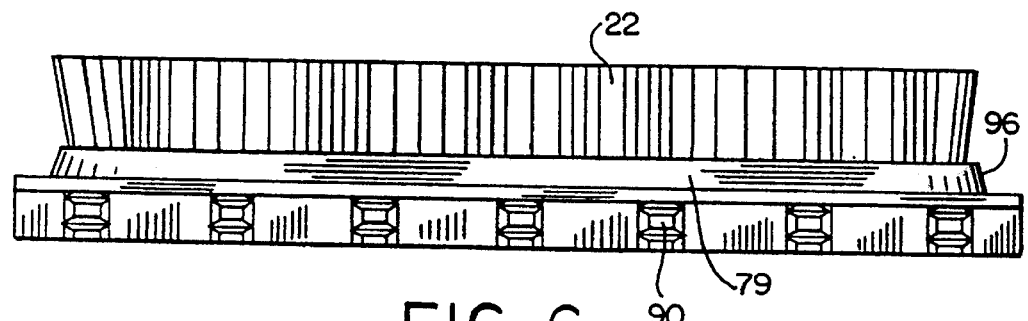
FIG. 6 is a view similar to FIG. 4, but with the bundle of filaments in place and the holder cup rim swaged to girdle and grip the bundle.

Referring now to FIGS. 4 and 5, there is illustrated one form of cup holder which may be used with the present invention. The cup holder may be machined from a block of relatively soft metal such as properly treated steel, aluminum, brass, and the like. The cup holder includes the flange 77. Below the flange the side walls of the body may be provided with slotted key elements 90 to enable the tool readily to be inserted axially into a honing machine head. The bottom 87 of the cup holder may be slightly curved as illustrated and is surrounded by the rim 79 which projects above the flanges 77. The opening formed by the rim in the illustrated embodiment is relatively narrow and substantially elongated and has two major sides as seen at 92 and 93 which are joined at the ends by semi-circular end sections 94 and 95. As seen in FIG. 6 at 96, both end sections are also uniformly inwardly swaged when the rim is formed.

Figure 8:
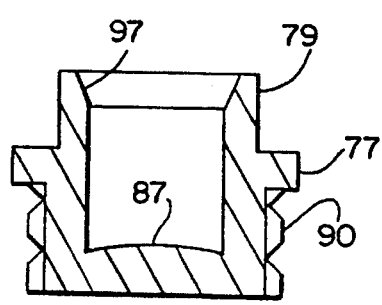
FIG. 8 is an enlarged transverse section of the holder before insertion and swaging; and, FIG. 9 is a view similar to FIG. 6, abut showing the finished product.
Figure 9:
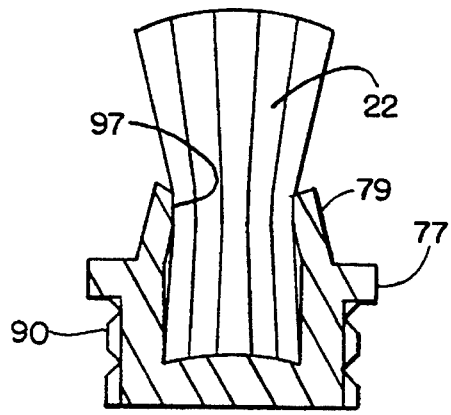

As seen more clearly in FIGS. 8 and 9, the interior of the rim 79, before it is swaged or clinched, is provided with a fairly substantial interior pilot surface seen at 97. Before the rim is swaged, the pilot surface extends at a significant angle to the vertical axis of the cup holder. However, after the rim is swaged, the pilot surface is essentially parallel to the axis of the tool as seen in FIG. 9. The pilot surface serves several purposes. One is to facilitate the insertion step. Another is to enhance the gripping of the bundle providing a larger surface area of direct gripping. Another is to thin or feather the very tip of the rim making it easier to swage to the position shown.

Figure 7:
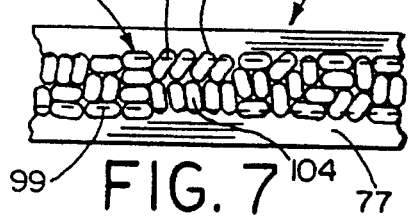
FIG. 7 is a fragmentary plan view of one form of tool using rectangular filaments.

As seen in FIG. 5, the opening of the cup holder is elongated and conforms to the relatively narrow slot formed by the rim into which the bundle of monofilaments is inserted. In the illustrated embodiment the opening or cup cavity of the cup holder may be about 0.188" wide by about 3.25" long. The basic size of the cavity may, however, vary from about 0.125" to about 0.50" wide and from about 0.50" to about 10.0" long. Also, the transverse shape of the monofilament may vary and include a variety of forms which may be round, square, or other shape elements. In FIG. 7, there is illustrated a typical rectangular monofilament which may typically be about 0.09" wide and about 0.045" thick. Thus, the monofilament is about twice as wide as it is thick.

With reference to the above dimensions and FIG. 7 which is a fragmentary view of the working face utilizing such rectangular monofilaments, it will be seen that before crimping the distance between the two major sides of the rim of the tool holder is slightly more than the width of two monofilaments. Also, the distance between the two major sides of the rim is slightly more than the thickness of four monofilaments. However, after the swaging or crimping operation, the distance between the two major sides of the rim seen at 98 and 99 in FIG. 7 is slightly less than the width of two monofilaments or slightly less than the thickness of four side-by-side monofilaments. Four side-by-side monofilaments are seen at 102 while two width-to-width monofilaments are seen at 103 and 104. The crimping or swaging operation tightly binds the monofilaments as shown causing them to twist or compact at the girdle creating the necessary secure grip on the bundle and also achieving the essentially random position of the rectangular monofilaments illustrated.

It will be appreciated, however, that the cup holder may take a variety of shapes depending upon the particular honing machine into which it is to be placed. Also, it is noted the cup holder may be made of a relatively soft metal to facilitate the swaging of the cup holder rim and the gripping of the bundle of monofilaments. It will, however be appreciated that a plastic cup holder may be used with heat being applied during the swaging or clinching operation followed by cooling to quench the deformed plastic in the desired gripping condition. Because of the relatively low cost in manufacture, whether metal or plastic, the entire tool is disposable when worn out.

The composition and size or shape of the monofilaments is discussed at some length in the above-noted prior copending applications. The abrasive is homogeneously entrained in the synthetic plastic material and may typically be 30–45% by weight of the monofilament. The abrasive material may vary widely from a silicon carbide to more exotic materials, such as super abrasives or mixtures thereof. An example of super abrasive would be polycrystalline diamond. The abrasive grain sizes may also vary widely from about 80 mesh to about 1000 mesh and above. Although nylon is the preferred material for the monofilaments, other plastic materials are useful such as aramids, polyesters, and polyimides. Again, the details of these plastic materials such as the partially crystalline preferred nylon are disclosed in considerable detail in such prior copending applications.

The monofilaments, particularly the rectangular cross-section such as illustrated in FIG. 7, are relatively stiff and such stiffness is enhanced by the relatively short distance the bundle projects from the cup holder. For example, the projecting length of the monofilaments may preferably vary from somewhat less than half the overall length to about two thirds or three quarters of the overall length of each monofilament.

There is accordingly provided a low cost honing tool which does not require the use of adhesives in the manufacturing process. The working surface of the tool is a dense, yet somewhat flexible, tightly packed bundle of the tips of the described monofilaments. The tips on the inner portions of the bundle have little or no flexibility while the tips on the outer edges of the bundle may have some flexibility, yet mostly away from the core of the bundle. The tips may lie in the same plane or the face of the tool may be that of the cylindrical surface being honed. The honing tool is disposable and may be mounted in essentially any type of honing machine head which provides rotational, oscillatory, or reciprocating movement while in contact with a workpiece for the purpose of removing material. The tool may be held stationary while the work moves. The tool removes material without tearing and folding the stock material on a microscopic level, thus improving the surface finish and integrity of the piece part. The tool is also capable of removing existed folded and torn material from previous removal or forming operations such as rough honing.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

We claim:

1. A honing tool comprising an elongated cup holder having a bottom and an integrally formed generally thin projecting rim, a correspondingly elongated bundle of generally parallel tightly packed abrasive containing monofilaments, one end of said bundle being inserted into the cup holder to the bottom, the other end projecting outwardly of the cup holder beyond the rim, the projecting packed tips of the bundle forming the working face of the tool, said rim being deformed inwardly to girdle and grip the bundle locking the bundle to the holder.

2. A honing tool as set forth in claim 1 wherein said cup holder is elongated so that said rim has two major parallel sides relatively close to each other.

3. A honing tool as set forth in claim 1 wherein said cup holder is formed of a somewhat soft metal.

4. A honing tool as set forth in claim 1 wherein said one end of said bundle engages the bottom of the cup holder.

5. A honing tool as set forth in claim 4 wherein said bottom is curved and said monofilaments are each of equal length to impart a curved working face to the tool.

6. A honing tool as set forth in claim 1 wherein said monofilaments are generally rectangular in transverse section each having a width and thickness.

7. A honing tool as set forth in claim 6 wherein the distance between the two major sides is slightly less than the width of two monofilaments.

8. A honing tool as set forth in claim 6 wherein the distance between the two major sides is about the thickness of four monofilaments.

9. A honing tool as set forth in claim 1 wherein the plastic of said monofilaments is selected from the group consisting of nylon, aramid, polyester or polyimide.

10. A honing tool as set forth in claim 9 wherein each monofilament has abrasive homogeneously embedded therein.

11. A honing tool as set forth in claim 10 wherein each monofilament contains at least about 30% by weight of abrasive.

12. A honing tool as set forth in claim 1 wherein the inside of the rim is formed with a pilot surface which girdles and grips the bundle when the rim is deformed.

13. A honing tool as set forth in claim 1 wherein the projecting length of the monofilaments beyond the rim is up to about three quarters of the overall length of such monofilaments.

\* \* \* \* \*